US009361692B2

(12) United States Patent
Suk et al.

(10) Patent No.: US 9,361,692 B2
(45) Date of Patent: Jun. 7, 2016

(54) IMAGE REGISTRATION DEVICE AND OPERATION METHOD OF THE SAME

(71) Applicant: Electronics and Telecommunications Research Institute, Daejeon (KR)

(72) Inventors: Jung Hee Suk, Daejeon (KR); Chun-Gi Lyuh, Daejeon (KR); Ik Jae Chun, Daejeon (KR); Tae Moon Roh, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 63 days.

(21) Appl. No.: 14/099,656

(22) Filed: Dec. 6, 2013

(65) Prior Publication Data

US 2014/0286577 A1 Sep. 25, 2014

(30) Foreign Application Priority Data

Mar. 22, 2013 (KR) .................... 10-2013-0030880

(51) Int. Cl.
*G06K 9/38* (2006.01)
*G06K 9/00* (2006.01)
*G06T 7/00* (2006.01)

(52) U.S. Cl.
CPC .................... *G06T 7/0028* (2013.01)

(58) Field of Classification Search
CPC ......... G06T 1/00; G06T 7/0028; G06T 7/001; G06T 7/0044; G06T 7/0046; G06T 7/2006; G06T 7/2033; G06T 15/04; G06T 9/008; G06T 7/0051; G06T 7/003; G06T 7/00; G06K 9/62; G06F 17/30
USPC ......... 382/190, 192, 194, 195, 209, 169, 170, 382/171, 172, 173, 181, 274, 266, 305; 340/5.53, 5.83
See application file for complete search history.

(56) References Cited

U.S. PATENT DOCUMENTS

| 7,409,108 | B2 * | 8/2008 | Xu et al. | 382/294 |
| 8,401,312 | B2 * | 3/2013 | Chertok et al. | 382/224 |
| 8,965,133 | B2 * | 2/2015 | Shiiyama | 382/201 |
| 2012/0154604 | A1 * | 6/2012 | Chen et al. | 348/187 |

FOREIGN PATENT DOCUMENTS

| KR | 10-2005-0063991 A | 6/2005 |
| KR | 10-2012-0105764 A | 9/2012 |

* cited by examiner

*Primary Examiner* — Sheela C Chawan

(57) ABSTRACT

Provided is an image registration device including a first feature vector magnitude calculating unit calculating magnitudes of feature vectors corresponding to any one first feature point among feature points of a reference image to create a first magnitude value, a second feature vector magnitude calculating unit calculating magnitudes of feature vectors corresponding to any one second feature point among feature points of a target image to create a second magnitude value, a magnitude difference calculating unit receiving the first and second magnitude values and calculating a difference between the received first and second magnitude values to create a third magnitude value, a first threshold value creating unit creating a first threshold value on the basis of the first magnitude value and a magnitude ratio, and a magnitude difference determining unit receiving the third magnitude value and the first threshold value, and determining a magnitude difference.

8 Claims, 6 Drawing Sheets

IMAGE REGISTRATION DEVICE AND OPERATION METHOD OF THE SAME

CROSS-REFERENCE TO RELATED APPLICATIONS

This U.S. non-provisional patent application claims priority under 35 U.S.C. §119 of Korean Patent Application No. 10-2013-0030880, filed on Mar. 22, 2013, the entire contents of which are hereby incorporated by reference.

BACKGROUND OF THE INVENTION

The present invention disclosed herein relates to an image registration device, and more particularly, to an image registration device registering at least two images.

Recently, in order to push the limits of camera resolution, monitor a wide area, or create a panorama image, researches on image registration is being actively performed. The image registration means that a plurality of images are reconstructed as a single connected image. For the registration of two or more images, the image registration uses feature points and feature vectors of the images.

An image registration device performs complex and a large amount of calculations on the basis of the feature points and feature vectors. When processing videos in real time by using a plurality of cameras, the image registration device performs a larger amount of calculations. Accordingly, a time taken to perform an image registration operation increases.

SUMMARY OF THE INVENTION

The present invention provides an image registration device guaranteeing high speed operations and an operation method of the same.

Embodiments of the present invention provide image registration devices registering a reference image and a target image, including: a first feature vector magnitude calculating unit sequentially selecting first feature points of the reference image, and calculating magnitudes of feature vectors corresponding to the selected first feature points to create a first magnitude value; a second feature vector magnitude calculating unit sequentially selecting second feature points of the target image, and calculating magnitudes of feature vectors corresponding to the selected second feature points to create a second magnitude value; a magnitude difference calculating unit receiving the first and second magnitude values and calculating a difference between the received first and second magnitude values to create a third magnitude value; a first threshold value creating unit creating a first threshold value on the basis of the first magnitude value and a magnitude ratio; and a magnitude difference determining unit receiving the third magnitude value and the first threshold value, and determining a magnitude difference between the received third magnitude value and the first threshold value, wherein, when the third magnitude value is not determined to be greater than the first threshold value, the magnitude difference determining unit performs similarity calculation for the first and second feature points, and, when the third magnitude value is determined to be greater than the first threshold value, the magnitude difference determining unit compares other feature points of the target image with the first feature point.

In other embodiments of the present invention, image registration methods registering at least two images, include: calculating a magnitude of a first feature vector according to a first feature point among a plurality of feature points extracted from a reference image; calculating a magnitude of a second feature vector according to a second feature point among a plurality of feature points extracted from a target image; calculating a difference between magnitude values of the first and second feature vectors; creating a first threshold value on the basis of the magnitude value of the first feature vector and a magnitude ratio; comparing a magnitude difference between the first and second feature vectors and a magnitude of the first threshold value, wherein, when the magnitude difference between the first and second feature vectors is not determined to be greater than the first threshold value, similarity calculation is performed on the first and second feature points, and, when the magnitude difference between the first and second feature vectors is determined to be greater than the first threshold value, a magnitude of another feature point of the target image is compared with the magnitude of the first threshold value.

BRIEF DESCRIPTION OF THE DRAWINGS

The accompanying drawings are included to provide a further understanding of the present invention, and are incorporated in and constitute a part of this specification. The drawings illustrate exemplary embodiments of the present invention and, together with the description, serve to explain principles of the present invention. In the drawings.

DETAILED DESCRIPTION OF PREFERRED EMBODIMENTS

Preferred embodiments of the present invention will be described below in more detail with reference to the accompanying drawings. The present invention may, however, be embodied in different forms and should not be constructed as limited to the embodiments set forth herein. Rather, these embodiments are provided so that this disclosure will be thorough and complete, and will fully convey the scope of the present invention to those skilled in the art.

Hereinafter, it will be described about an exemplary embodiment of the present invention in conjunction with the accompanying drawings.

Figure 1:
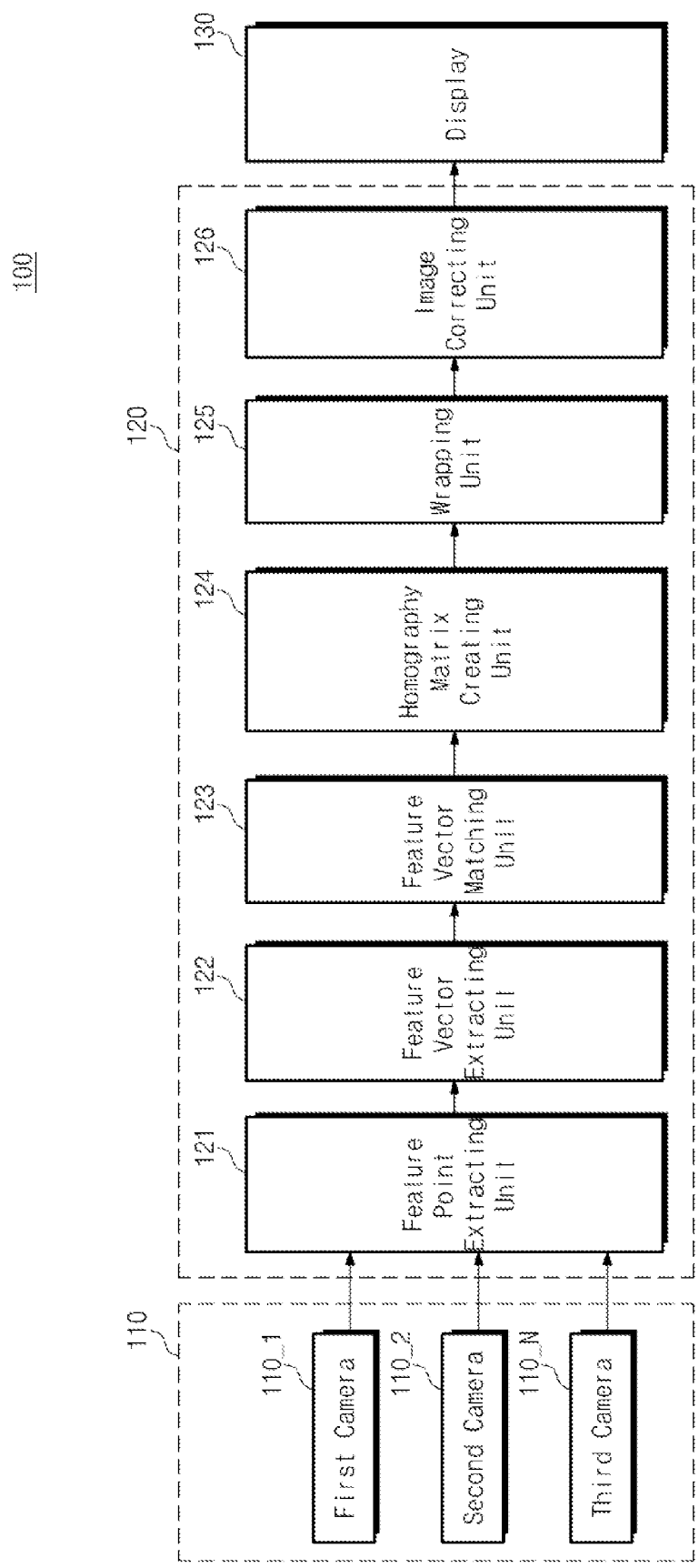
FIG. 1 is a block diagram illustrating an image registration system according to an embodiment of the present invention.

FIG. 1 is a block diagram illustrating an image registration system according to an embodiment of the present invention. Referring to FIG. 1, the image registration system 100 includes a camera unit 110, an image registration device 120, and a display 130.

The camera unit 110 includes a plurality of cameras 110_1 to 110_N. The plurality of cameras 110_1 to 110_N image a subject. For example, the plurality of cameras 110_1 to 110_N may be installed at a specific place such as a crossroad in order to create a panorama image.

The plurality of cameras 110_1 to 110_N may be also installed in a mobile body, such as a vehicle, a ship, or an aircraft. In this case, for creating images, the plurality of cameras 110_1 to 110_N may be attached to the mobile body as a fixed type in order to have different viewpoints. Images of the subject imaged from the plurality of cameras 110_1 to 110_N are not limited hereto, and various images can be imaged according to a user's intention.

The image registration device 120 includes a feature point extracting unit 121, a feature vector extracting unit 122, a feature point matching unit 123, a homography matrix creating unit 124, a warping unit 125, and an image correcting unit 126.

The feature point extracting unit 121 receives images from the plurality of cameras 110_1 to 110_N. The feature point extracting unit 121 extracts feature points of reference and target images among the received images. The reference and target images mean two images on which an image registration operation is to be performed.

The feature point extracting unit 121 uses an algorithm such as scale invariant feature transform (SIFT), speeded up robust features (SURF), or maximally stable extremal regions (MSER). However, the algorithms for extracting the feature points are not limited hereto.

The feature vector extracting unit 122 extracts feature vector information on the extracted feature points from the reference image. Also, the feature vector extracting unit 122 extracts feature vector information on the extracted feature points from the target image.

The feature point matching unit 123 receives information on the feature points of the reference and target images from the feature extracting unit 121. Also the feature point matching unit 123 receives the feature vector information on the feature points from the feature extracting unit 121.

The feature point matching unit 123 selects any one of the feature points of the reference image. The feature point matching unit 123 compares the feature points of the target image and the selected feature point from the reference image and selects the most similar feature point from among the feature points of the target image. The feature point matching unit 123 determines the selected feature points of the reference and target images as a matching pair.

Operations of selecting a feature point of the target image, which is the most similar feature point to any one feature point of the reference image, and determining the selected feature points as the matching pair may be called as a matching operation. The feature point matching unit 123 performs sequentially the matching operation for the feature points of the reference image. Also, the feature point matching unit 123 may reduce a calculation amount necessary for the matching operation by using magnitude values of the feature vectors. The feature point matching unit 123 will be described in detail in relation to FIG. 5.

The homography matrix creating unit 124 receives information on the matching pairs from the feature point matching unit 123. The information on the matching pairs may be coordinate information on the matching pairs. The homography matrix creating unit 124 creates a homography matrix by using the information on the matching pairs.

The warping unit 125 receives the created homography matrix from the homography matrix creating unit 124. The warping unit 124 performs a warping operation for the reference and target images by using the homography matrix.

The image correcting unit 126 performs a correction operation for the reference and target images by using a Blending algorithm or a Graphcut algorithm. The image registration device 120 sequentially performs image registration operations for the received other images from the plurality of cameras 110_1 to 110_N.

The display unit 130 provides an image that the image registration is performed to viewers.

Also, the image registration system 100 according to an embodiment of the present invention is described as the image registration operation on the basis of the feature points and the feature vectors for the two images.

Figure 2:
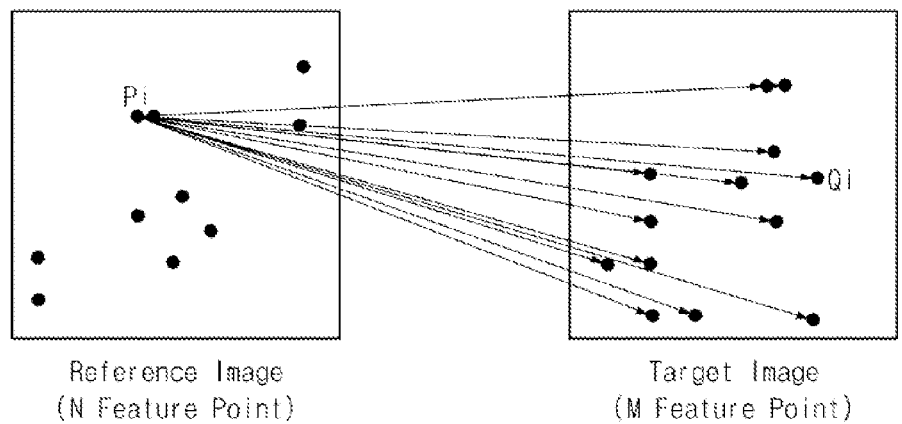
FIG. 2 illustrates feature points of reference and target images according to the feature point extracting unit in FIG. 1.

FIG. 2 illustrates feature points of the reference and target images according to the feature point extracting unit 122 of FIG. 1. Referring to FIGS. 1 and 2, the feature point extracting unit 121 receives first and second images from the plurality of cameras 110_1 to 110_N. The first image is a reference image imaged from the first camera 100_1. The second image is a target image imaged from the second camera 1002. The first and second cameras 100_1 and 100_2 are assumed to image an identical subject.

The reference image shown in FIG. 2 has N feature points, where N is an integer of 1 or greater, and the target image has M feature points, where M is an integer of 1 or greater. The N feature points are represented as first to i-th feature points P1 to Pi, and M feature points are represented as first to j-th feature points Q1 to Qj. Although the first and second cameras 100_1 and 100_2 image the same subject, the reference and target images may have different feature points.

When a matching operation is performed on any one selected feature point Pi from among the feature points of the reference image, the feature point matching unit 123 measures similarities between the selected feature point Pi and the M feature points of the target image. The feature point matching unit 123 matches the selected feature point Pi with the most similar feature point of the target image. The image registration device 120 performs the matching operation respectively on the N feature points of the reference image.

The feature point matching unit 123 performs similarity calculations maximally N*M times in order to match all the feature points of the reference image with each of the feature points of the target image. The number of times of calculating similarity is one of the greatest factors which disturb an operation speed of the image registration device 120. The feature point matching unit 123 may reduce the number of times of the similarity calculations in advance by using the magnitude values of the feature vectors.

Figure 3:
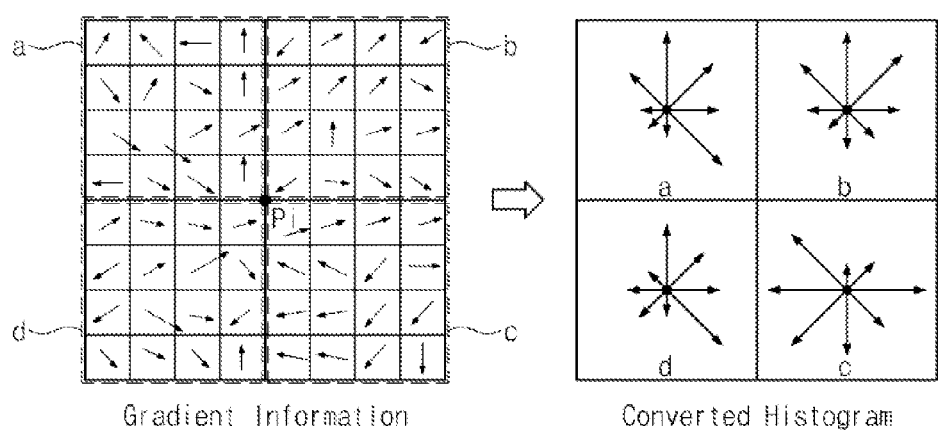
FIG. 3 illustrates creation of the feature vectors according to the feature vector extracting unit in FIG. 1.

FIG. 3 illustrates creation of the feature vectors according to the feature vector extracting unit in FIG. 1. Referring to FIGS. 1 to 3, the feature vector extracting unit 122 extracts predetermined gradient patterns from peripheral pixels around the selected feature point among the entire pixels forming the image.

As shown in FIG. 3, the feature point extracting unit 122 extracts the gradient patterns from peripheral pixels around a feature point Pi on the basis of any one feature point Pi from among the feature points of the reference image. For example, a size of entire pixels around the feature point Pi shown in FIG. 3 is 8×8, and each pixel includes a gradient pattern. However, the entire pixel size around the feature point is not limited to 8×8.

Also, the feature vector extracting unit 122 converts the gradient information into a histogram according to K-dimensional setting, where K is an arbitrary integer. For example, regions a to d shown in FIG. 3 respectively include the gradient information on 16 pixels. When the gradient information is converted into a histogram in 8-dimension, each piece of the gradient information included in the regions a to d is converted into a histogram according to 8-dimension setting.

Accordingly, the gradient information of the feature vectors is converted into a histogram in total 32-dimension. Also, the histogram may be variously implemented in 64-dimension, 128-dimension, or 256-dimension.

Figure 4:
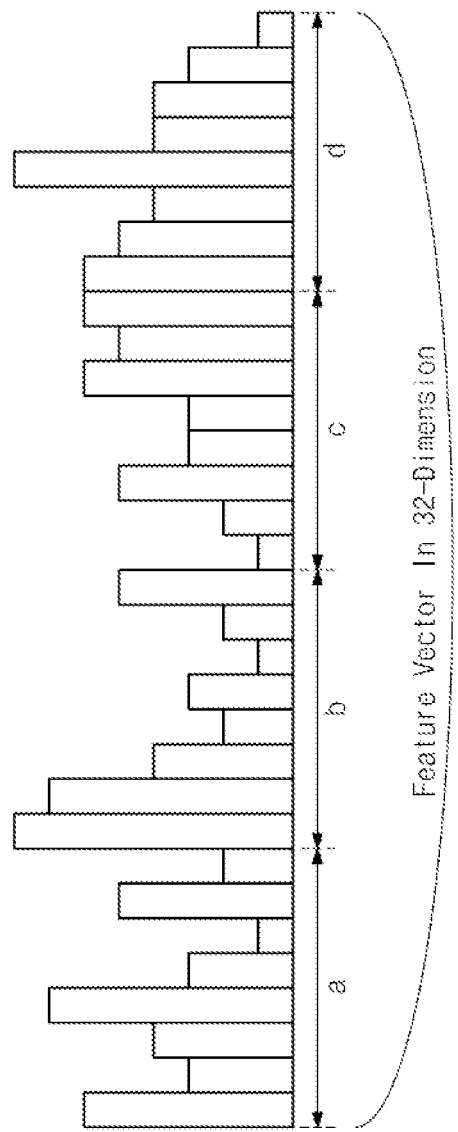
FIG. 4 illustrates a histogram of the feature vectors shown in FIG. 3.

FIG. 4 illustrates a histogram of the feature vectors shown in FIG. 3. Referring FIGS. 3 and 4, gradient information around a feature point Pi is converted into a histogram in 32-dimension. Through the conversion process into the histogram, the magnitude values of the feature vectors for the respective feature points may be figured out.

Figure 5:
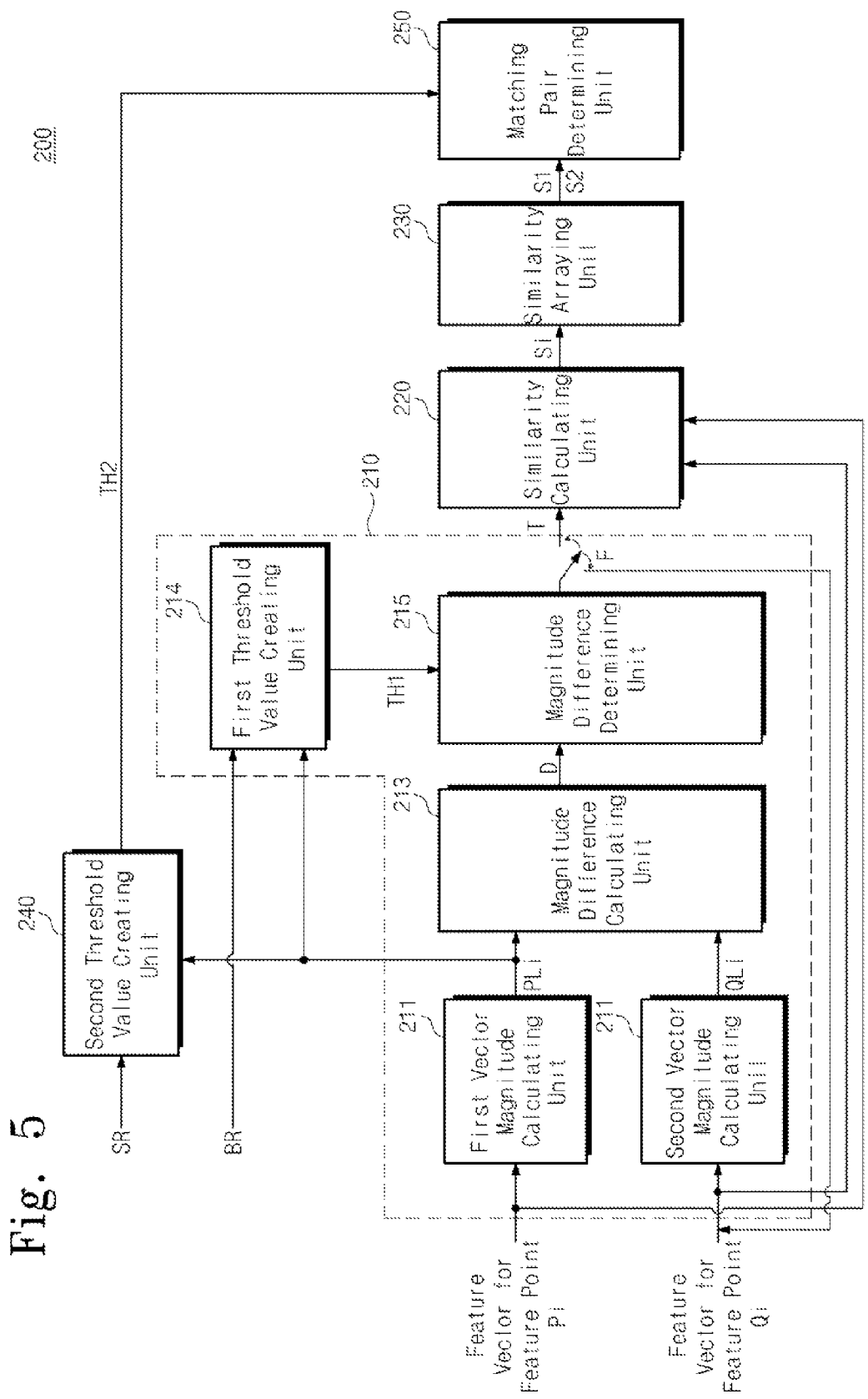
FIG. 5 is a block diagram illustrating a feature point matching unit according to an embodiment of the present invention.

FIG. 5 is a block diagram illustrating a feature point matching unit according to an embodiment of the present invention. Referring to FIG. 5, the feature point matching unit 200 includes a magnitude comparing unit 210, a similarity calculating unit 220, a similarity arranging unit 230, a second threshold value creating unit 240, and a matching pair determining unit 250.

The magnitude comparing unit 210 includes a first feature vector magnitude calculating unit 211, a second feature vector magnitude calculating unit 212, a magnitude difference calculating unit 213, a first threshold value creating unit 214, and a magnitude difference determining unit 215.

The first feature vector magnitude calculating unit 211 receives feature vector information on any one feature point among the feature points P1 to Pi of the reference image. The feature vector information includes magnitude values of feature vectors of each dimension. The feature vector magnitude calculating unit 211 calculates the magnitudes of the feature vectors of each dimension to create a first magnitude value PLi. For description of the feature point matching unit 200, it is assumed that any one feature point of the feature points P1 to Pi of the reference image is selected as a first feature point P1.

For example, the first feature vector magnitude calculating unit 211 may create the first magnitude value PLi in a way of summing all the magnitudes of the feature vectors of each dimension or obtaining an average magnitude value. However, the way of creating the first magnitude value PLi is not limited thereto.

The first feature vector magnitude calculating unit 211 transfers the first magnitude value PLi to the magnitude difference calculating unit 213, the first threshold creating unit 214, and the second threshold value calculating unit 240.

The second feature vector magnitude calculating unit 212 receives information on a feature vector of any one feature point among the feature points Q1 to Qj of the target image. The feature vector information includes a magnitude value of the feature vector of each dimension. The second feature vector magnitude calculating unit 212 calculates magnitudes of the feature vectors of each dimension and creates a second magnitude value QLi. Also, for description of the feature point matching unit 200, it is assumed that any one feature point of the feature points Q1 to Qj of the target image is selected as a first feature point Q1.

For example, the second feature vector magnitude calculating unit 212 may create the second magnitude value QLi in a way of summing all the magnitudes of the feature vectors of each dimension or obtaining an average magnitude value. However, the way of creating the second magnitude value QLi is not limited thereto. The second feature vector magnitude calculating unit 212 transfers the second magnitude value QLi to the magnitude difference calculating unit 213.

The magnitude difference calculating unit 213 receives the first and second magnitude values PLi and QLi from the first and second feature vector magnitude calculating units 211 and 212. The magnitude difference calculating unit 213 calculates a difference between the first and second magnitude values PLi and QLi to create a third magnitude value D. The magnitude difference calculating unit 213 transfers the third magnitude value D to the magnitude difference determining unit 215.

The first threshold value creating unit 214 receives the first magnitude value PLi from the first feature vector magnitude calculating unit 211 and information on an externally set magnitude ratio BR. The first threshold value creating unit 214 creates the first threshold value TH1 according to the first magnitude value PLi on the basis of the magnitude ratio BR. The first threshold value creating unit 214 transfers the first threshold value TH1 to the magnitude difference determining unit 215. Operations of the first threshold value creating unit 214 will be described in detail in relation to FIG. 6.

The magnitude difference determining unit 215 receives the third magnitude value D from the magnitude difference calculating unit 214 and the first threshold value TH1 from the first threshold value creating unit 214. The magnitude difference determining unit 215 determines a magnitude difference between the first feature points P1 and Q1 according to the reference and target images on the basis of the third magnitude value D and the first threshold value TH1.

When determining that the first feature points P1 and Q1 may be matched, the magnitude difference determining unit 215 transfers a matching signal T to the similarity calculating unit 220. On the contrary, when determining that the first feature points P1 and Q1 may not be matched, the magnitude difference determining unit 215 creates a feedback signal F to perform matching on a next candidate of a target image. A second feature point Q2 may be the next candidate of the target image.

As described above, the magnitude difference determining unit 215 compares the first feature point P1 of the reference image and all the feature points Q1 to Qj of the target image on the basis of the magnitude values of the feature vectors. Accordingly, the similarity calculating unit 220 receives the matching signal T from the magnitude difference determining unit 215. Also the similarity calculating unit 220 receives two feature points Pi and Qj corresponding to the matching signal T from the feature vector extracting unit 112. The similarity calculating unit 220 calculates an inner product of two feature vectors Pi and Qj and obtains an arccosine value Si for the calculated inner product. In an embodiment, the arccosine value Si is defined as similarity value Si of the two feature points. The similarity calculating unit 220 transfers the similarity value Si to the similarity arranging unit 230.

In addition, the similarity calculating unit 220 repeatedly performs the similarity operation on matching pairs which are candidates of matching possibility through the magnitude comparing unit 210. The similarity calculating unit 220 transfers similarities S1 to Si of the matching pairs which are candidates of the matching possibility.

The similarity arranging unit 230 receives similarities S1 to Si of the matching pairs from the similarity calculating unit 220. The similarity arranging unit 230 defines a minimum value among the received similarities S1 to Si as a first minimum value S1. In an embodiment, two feature points Pi and Qj forming the first minimum value S1 become matching candidates together. The similarity arranging unit 230 defines a second minimum value among the similarities S1 to Si as a second minimum value S2. The similarity arranging unit 230 transfers information on the first and second minimum values S1 and S2 to the matching pair determining unit 250.

The second threshold value 240 receives the first magnitude value PLi from the first feature vector magnitude calculating unit 211. Also, the second threshold value creating unit 240 receives information on the similarity ratio SR from the outside. The second threshold value creating unit 240 creates a second threshold value TH2 in response to the similarity ratio SR and the first magnitude value PLi.

In an embodiment, the externally received similarity ratio SR is defined as a linearly or nonlinearly variable, but not fixed, function. The second threshold value creating unit 240 transfers the second threshold value TH2 to the matching pair determining unit 250. Operations of the second threshold value creating unit 240 will be described in detail in relation to FIG. 7.

The matching pair determining unit 250 receives the first and second minimum values S1 and S2 from the similarity arranging unit 230. Also, the matching pair determining unit 250 receives the second threshold value TH2 from the second threshold value creating unit 240. The matching pair determining unit 250 compares magnitudes of the first and second minimum values S1 and S2 and determines whether the two feature points Pi and Qj match.

As described above, in matching the two feature points, the feature point matching unit 200 may reduce matching pair candidates in advance through the magnitude comparing unit 210. Accordingly, an operation time necessary for the feature point matching can be reduced.

Figure 6:
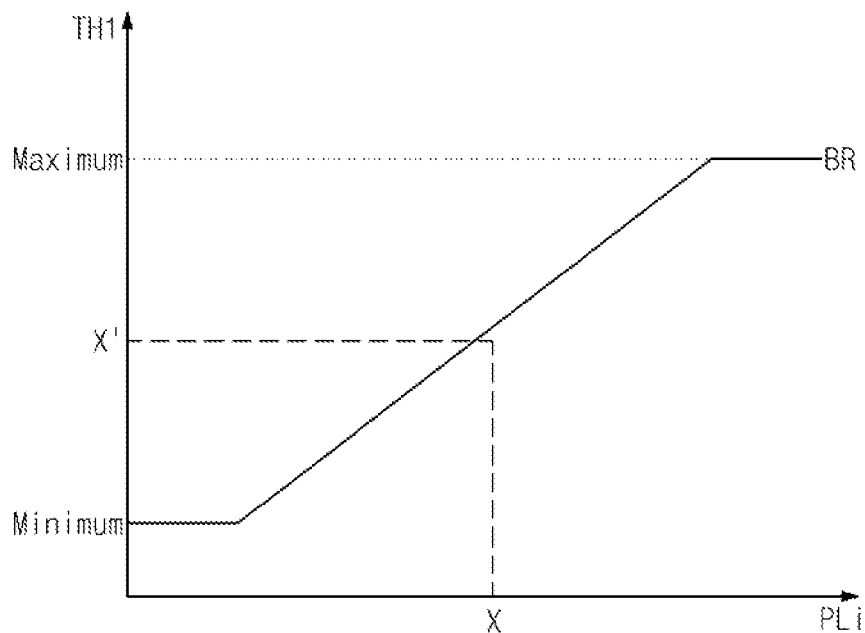
FIG. 6 illustrates creation of a first threshold value according to an embodiment of the present invention.

FIG. 6 illustrates creation of the first threshold value according to an embodiment of the present invention. Referring to FIGS. 5 and 6, the first threshold value creating unit 214 creates the first threshold value TH1 according to the externally set magnitude ratio BR. When the first magnitude value PLi increases, the first threshold value Th1 becomes increased on the basis of the magnitude ratio BR.

Also, the magnitude ratio BR is set to allow the first threshold value Th1 to have minimum and maximum values. The magnitude ratio BR shown in FIG. 6 is illustrated as a linear function which is linearly increased, but it is not limited hereto and may be represented as various functions.

For example, it is assumed that the first magnitude value PLi for any one feature vector among the feature vectors Pi of the reference image is X. The first threshold value creating unit 214 creates X' as the first threshold value corresponding to a magnitude of X on the basis of the magnitude ratio BR. The first threshold value creating unit 214 transfers a value of X' to the magnitude difference determining unit 215, the magnitude difference determining unit 215 compares X' and the third magnitude value D.

Figure 7:
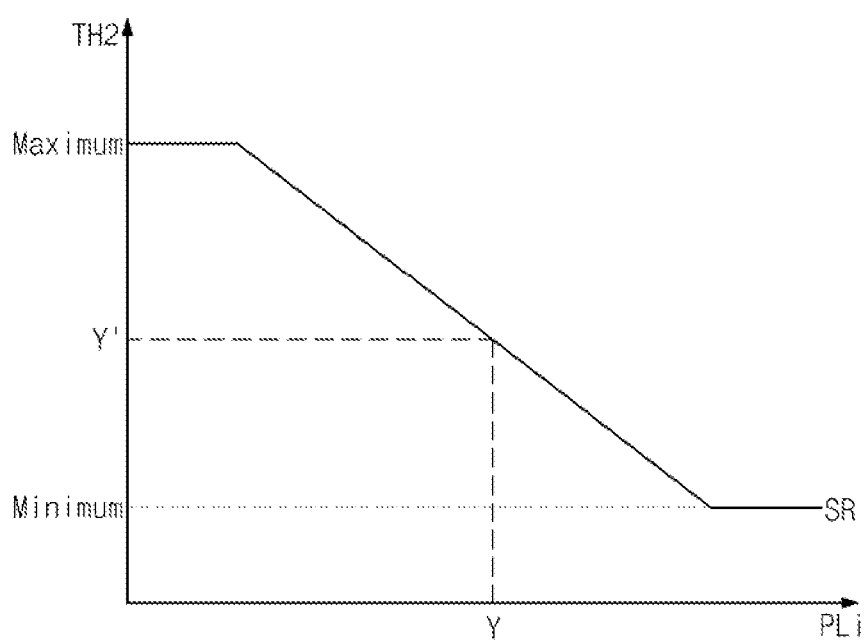
FIG. 7 illustrates creation of a second threshold value according to an embodiment of the present invention.

FIG. 7 illustrates creation of the second threshold value according to an embodiment of the present invention. Referring to FIGS. 5 and 7, the second threshold value creating unit 240 creates the second threshold value TH2 according to the externally set similarity ratio SR. As the first magnitude value PLi is increased, the second threshold value TH2 is decreased on the basis of the similarity ration SR.

In an embodiment, the similarity ration SR is defined as a linearly or nonlinearly variable, but not a fixed, function. Also, the similarity ratio SR is set to allow the second threshold value TH2 to have minimum and maximum values.

For example, it is assumed that the first magnitude value PLi is Y for any one feature vector among the feature vectors Pi of the reference image. The second threshold value creating unit 240 creates Y' as the second threshold value TH2 corresponding to a magnitude of Y on the basis of the similarity ratio SR.

Figure 8:
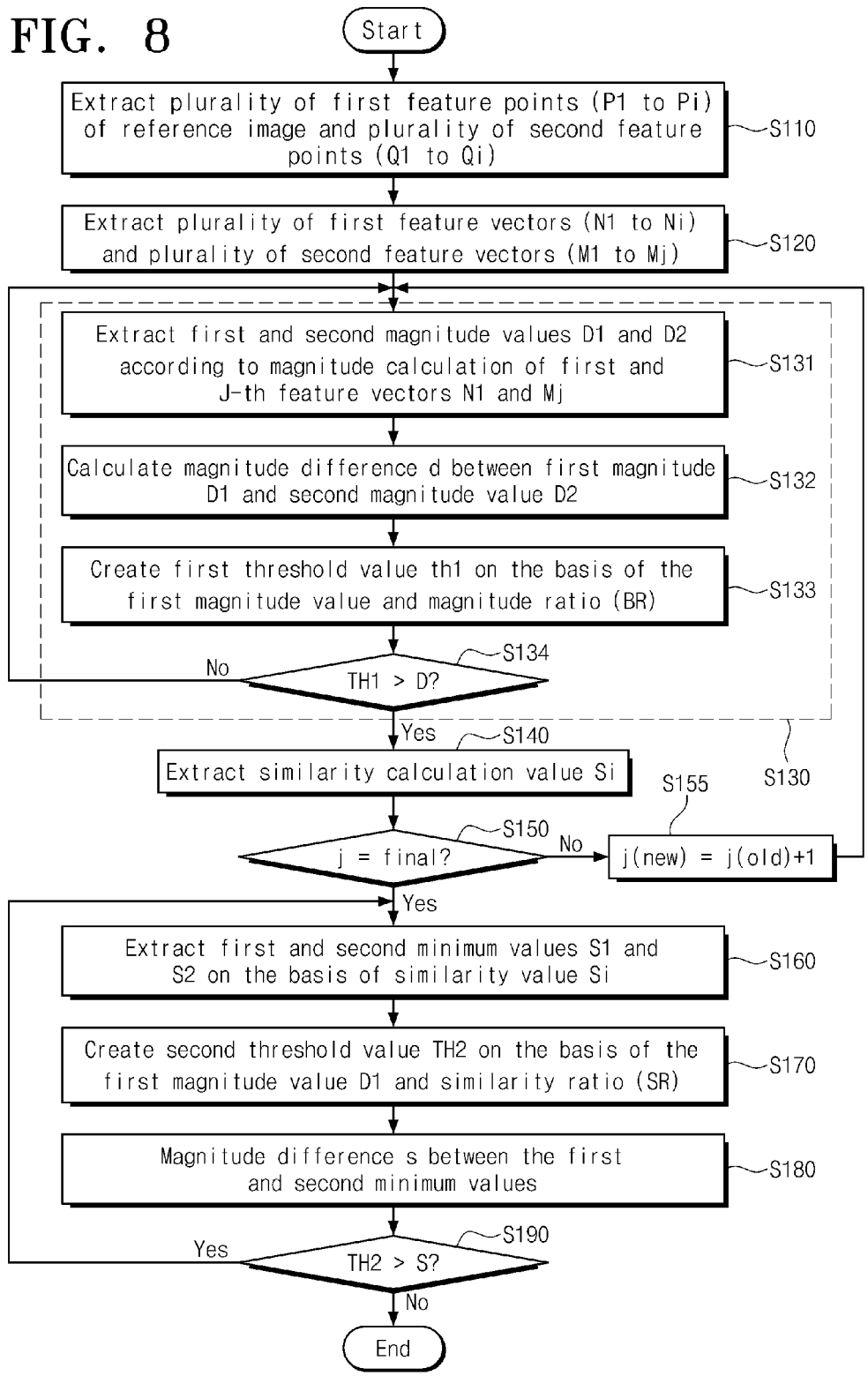
FIG. 8 is a flowchart illustrating an operation of the feature point matching unit according to an embodiment of the present invention.

FIG. 8 is a flowchart illustrating an operation of the feature point matching unit according to an embodiment of the present invention. Referring to FIG. 8, in operation S110, a plurality of first feature points P1 to Pi of the reference image and a plurality of second feature points Q1 to Qj of the target image are extracted.

In operation S120, feature vectors N1 to Ni for the plurality of first feature points P1 to Pi and feature vectors M1 to Mj for the plurality of second feature points Q1 to Qj are extracted.

In operation S130, a first feature point P1, which is any one of the plurality of first feature points P1 to Pi, and the plurality of second feature points Q1 to Qj are compared in magnitude. A matching possibility may be determined in advance through the magnitude comparison between two feature vectors. Also, the first feature point P1 of the plurality of first feature points P1 to Pi is arbitrarily selected, or another feature point Pi may be also selected.

In operation S131, magnitudes of a first feature vector N1 for the first feature point P1 and j feature vectors (M1 to Mj) for the second feature points Q1 to Qj are calculated respectively. Firstly, the first feature vector N1 is compared in magnitude with the first feature vector M1. The magnitude calculation value of the first feature vector M1 is assumed as a first magnitude D1 and the magnitude calculation value of the second feature vector M2 is assumed as a second magnitude value D2. Also, for the magnitude calculation, a way of summing all the magnitudes of the feature vectors of each dimension or a way of obtaining an average magnitude may be used.

Operation S132, a difference between the first and second magnitude values D1 and D2 is calculated. The difference value of the first and second magnitude values D1 and D2 is assumed as the third magnitude value D.

In operation S133, the first threshold value TH1 is created according to the first magnitude value D1 on the basis of the externally set magnitude ratio BR. The first threshold value TH1 increases as the first magnitude value D1 increases, and decreases as the first magnitude value D1 decreases.

In operation S134, a matching possibility for the two feature vectors is determined through magnitude comparison between the first threshold value TH1 and the third magnitude value D. When the first threshold value TH1 is not greater than the third magnitude value D (No), the two feature vectors are not determined to have matching possibility. Accordingly, a feature vector for the next feature point Qj of the target image is extracted. For example, the second feature vector M2 is extracted and operation S130 is repeated.

On the contrary, when the first threshold value Th1 is greater than the third magnitude value D (Yes), the two feature vectors are determined to have matching possibility. Accordingly, similarity calculation for the feature vector N1 and the first feature vector M1 is performed.

As described above, in operation S134, the number of the matching pair candidates can be reduced by determining whether there is a possibility of matching pair candidates in advance through magnitude comparison.

In operation S140, the similarity calculation is performed on the matching pair candidates that are determined to have matching possibility. In the similarity calculation, an inner product between the first feature vectors N1 and M1 is calculated and an arccosine value may be obtained on the basis of the inner product. The arccosine value means the similarity value Si.

In operation S150, it is determined that magnitude comparison is entirely performed on the first feature point N1 and j feature vectors M1 to Mj. When the magnitude comparison for the first feature point N1 and j feature vectors M1 to Mj are not entirely performed (No), operation S130 is performed on the first feature point N1 and the next feature vector Mj. In operation S155, a j-th feature vector Mj of another candidate is selected which is to be compared with the first feature vector N1.

On the contrary, when it is determined that the magnitude comparison for the first feature vector N1 and the j feature vectors M1 to Mj is entirely performed (Yes), similarity arrangement is performed.

In operation S160, the similarity arrangement is performed on the basis of the similarity values S1 to Si of the matching candidates. First and second minimum values S1 and S2 among the similarity values S1 to Si are extracted.

In operation S170, the second threshold value TH2 is created according to the first magnitude D1 on the basis of the externally set similarity ratio SR. The second threshold value TH2 decreases as the first magnitude value D1 increases.

In operation S180, a magnitude difference between the first and second minimum values S1 and S2 is calculated. The magnitude difference between the first and second minimum values S1 and S2 is assumed as a fourth value S.

In operation S190, through comparison of the second threshold value Th2 with the fourth magnitude value S, it is determined whether the two feature vectors match with each other. When the second threshold value TH2 is greater than the fourth magnitude value S (Yes), it is determined that the two feature points forming the first and second minimum values S1 and S2 do not match. Accordingly, a minimum value for the next candidate is extracted and compared with the first minimum value S1.

On the contrary, when the second threshold value TH2 is not greater than the fourth magnitude value S (No), the two feature points forming the first and second minimum values S1 and S2 are determined as matched. Accordingly, the matching operation for the first feature point P1 of the reference image is terminated.

The feature point matching operation shown in FIG. 8 is described on the basis of the first feature point P1 and the second feature points Q1 to Qj. In an embodiment, after the matching operation based on the first feature point P1 is completed, matching operations for a next feature point Pi of the reference image may be repetitively performed. For example, matching operations for the first feature point P2 and the plurality of second feature points Q1 to Qj may be performed.

According to the embodiments, before performing a similarity operation necessary for image registration, an image registration device can use magnitude information on feature vectors to reduce unnecessary operations. Accordingly, the image registration device can register images in a high speed operation.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An image registration method for registering at least two images captured by a plurality of cameras, the method comprising:
   receiving a target image and a reference image from the plurality of cameras;
   calculating, by a processor, a magnitude of a first feature vector according to a first feature point among a plurality of feature points extracted from a reference image;
   calculating, by the processor, a magnitude of a second feature vector according to a second feature point among a plurality of feature points extracted from a target image;
   calculating, by the processor, a difference between magnitude values of the first and second feature vectors;
   creating, by the processor, a first threshold value on the basis of the magnitude value of the first feature vector and a magnitude ratio;
   comparing, by the processor, a magnitude difference between the first and second feature vectors and a magnitude of the first threshold value; and
   constructing, by the processor, a single combined digital image from the target image and the reference image,
   wherein, when the magnitude difference between the first and second feature vectors is not determined to be greater than the first threshold value, similarity calculation is performed on the first and second feature points, and, when the magnitude difference between the first and second feature vectors is determined to be greater than the first threshold value, a magnitude of another feature point of the target image is compared with the magnitude of the first threshold value.

2. The image registration method of claim 1, wherein the first threshold value increases as a magnitude of the first feature vector increases on the basis of the magnitude ratio.

3. The method of claim 1, further comprising:
   matching, by the processor, the at least two images.

4. The method of claim 3, further comprising:
   displaying a portion of the matched at least two images as a single image on a digital display device.

5. The method of claim 1, wherein the magnitude ratio is a ratio between the first threshold value and the first magnitude value.

6. The method of claim 1, wherein the similarity ratio is a ratio between a second threshold value and the second magnitude value.

7. The method of claim 1, further comprising:
   storing the single combined digital image in a memory.

8. The method of claim 1, further comprising:
   displaying the single combined digital image on a digital display device.

* * * * *